United States Patent
Matsui

(10) Patent No.: US 12,341,346 B2
(45) Date of Patent: Jun. 24, 2025

(54) RENEWABLE ENERGY-USE POWER SYSTEM

(71) Applicant: DIAMOND&ZEBRA ELECTRIC MFG.CO., LTD., Osaka (JP)

(72) Inventor: Shigezumi Matsui, Osaka (JP)

(73) Assignee: DIAMOND & ZEBRA ELECTRIC MFG.CO., LTD., Osaka (JP)

( * ) Notice: Subject to any disclaimer, the term of this patent is extended or adjusted under 35 U.S.C. 154(b) by 0 days.

(21) Appl. No.: 18/427,674

(22) Filed: Jan. 30, 2024

(65) Prior Publication Data

US 2024/0313544 A1    Sep. 19, 2024

(30) Foreign Application Priority Data

Jan. 30, 2023    (JP) .................. 2023-011737

(51) Int. Cl.
*H02J 3/38*    (2006.01)
(52) U.S. Cl.
CPC .............. *H02J 3/38* (2013.01); *H02J 2300/24* (2020.01)

(58) Field of Classification Search
CPC ................................ H02J 3/38; H02J 2300/24
See application file for complete search history.

(56) References Cited

FOREIGN PATENT DOCUMENTS

JP    2002-354677 A    12/2002

*Primary Examiner* — Robert L Deberadinis
(74) *Attorney, Agent, or Firm* — Maschoff Brennan

(57) ABSTRACT

In a renewable energy-use power system provided with a battery, a DC-DC converter converts the output of a power generation unit that generates electric power using renewable energy into DC power of a predetermined voltage, and outputs the converted power to a DC bus. A power conversion unit converts the DC power of the DC bus into DC power or AC power and outputs the converted power outside the system. A switch is connected between the DC bus and a battery and configured to be switchable between the ON state and the OFF state. The DC-DC converter changes the voltage value of the DC power to be output depending on the ON/OFF state of the switch.

2 Claims, 4 Drawing Sheets

RENEWABLE ENERGY-USE POWER SYSTEM

CROSS-REFERENCE

This application claims priority to Japanese Patent Application No. 2023-11737 filed on Jan. 30, 2023. The entire disclosure of this application is incorporated by reference herein.

BACKGROUND

The present disclosure relates to an electric power system having a power generation unit using renewable energy and a battery.

FIG. 4 shows a configuration example of a conventional solar photovoltaic system shown in FIG. 1 of Japanese Unexamined Patent Publication No. 2002-354677. In the configuration of FIG. 4, a power conditioner 11 includes: a step-up chopper (DC-DC converter) 12 receiving the output of a solar battery 20; an inverter 13 converting DC power from the step-up chopper 12 into AC power; and a bidirectional chopper (DC-DC converter) 14 provided between an input line for the inverter 13 and a storage battery 21.

In general, in DC-DC converters and inverters, the conversion efficiency decreases when the difference between the input voltage and the output voltage is large. In the configuration of the cited patent document, for example, the output of the step-up chopper 12 and the bidirectional chopper 14 used for charge/discharge of the storage battery 21 are connected to the input line for the inverter 13. With the presence of the bidirectional chopper 14, the output voltage of the step-up chopper 12 can be set to a voltage suitable for the operation of the inverter 13 irrespective of the charge/discharge voltages of the storage battery 21. However, this leads to increase in cost because a circuit serving as the bidirectional chopper 14 is necessary.

Also, batteries, which become short in life when being charged/discharged at all times, are shorter in life than other components. It is therefore preferable to reduce charging/discharging as much as possible.

SUMMARY

An objective of the present disclosure is providing a renewable energy-use power system provided with a battery, in which decrease in power conversion efficiency is prevented, increase in cost is prevented, and the life of the battery is prolonged. According to a mode of the present disclosure, a renewable energy-use power system includes: a power generation unit configured to generate electric power using renewable energy; a DC-DC converter configured to convert an output of the power generation unit into DC power of a predetermined voltage and output the converted DC power to a DC bus; a power conversion unit configured to convert DC power of the DC bus into DC power or AC power; a switch connected to the DC bus and configured to be switchable between an ON state and an OFF state; a battery connected to the switch; and a control unit configured to control ON/OFF switching of the switch, wherein the DC-DC converter changes a voltage value of the DC power to be output depending on the ON/OFF state of the switch.

According to the present disclosure, in a renewable energy-use power system provided with a battery, it is possible to prevent decrease in power conversion efficiency, prevent increase in cost, and prolong the life of the battery.

DETAILED DESCRIPTION

Figure 1:
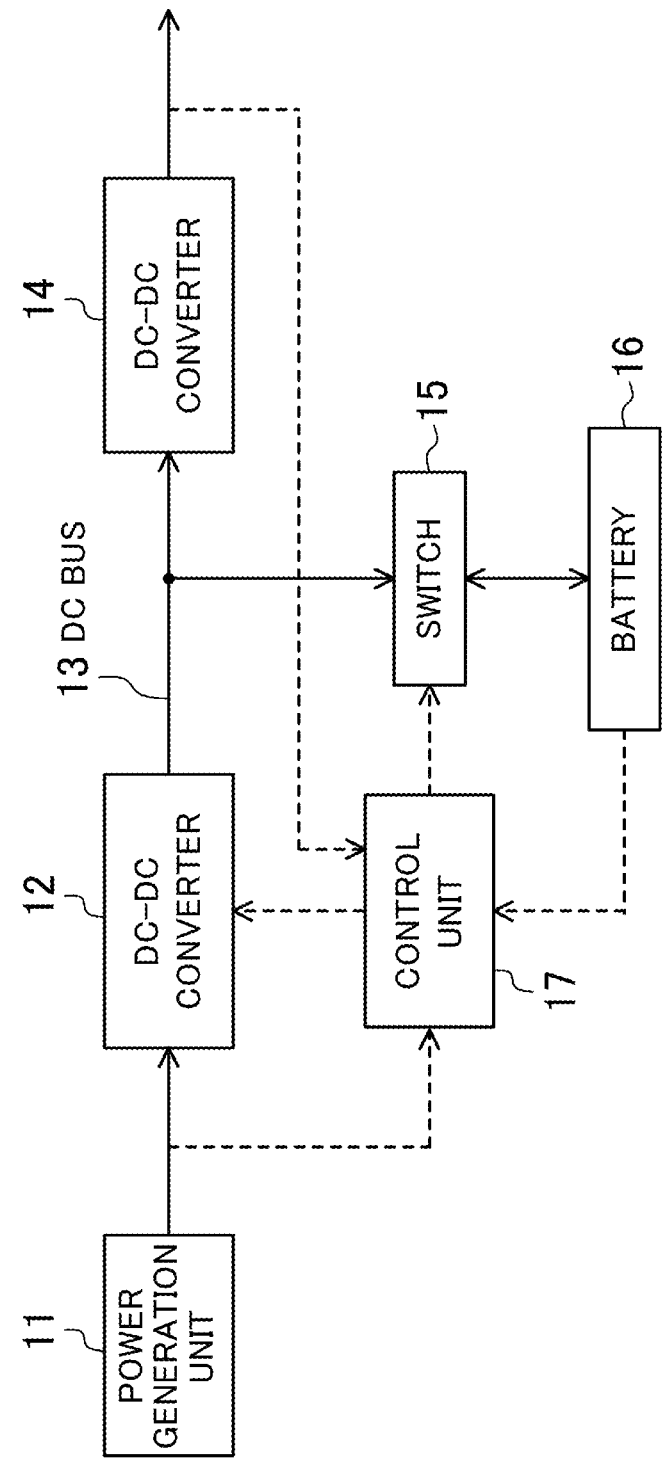
FIG. 1 shows a configuration of a renewable energy-use power system according to the first embodiment.

According to one mode of the present disclosure, a renewable energy-use power system includes: a power generation unit configured to generate electric power using renewable energy; a DC-DC converter configured to convert an output of the power generation unit into DC power of a predetermined voltage and output the converted DC power to a DC bus; a power conversion unit configured to convert DC power of the DC bus into DC power or AC power; a switch connected to the DC bus and configured to be switchable between an ON state and an OFF state; a battery connected to the switch; and a control unit configured to control ON/OFF switching of the switch, wherein the DC-DC converter changes a voltage value of the DC power to be output depending on the ON/OFF state of the switch.

With the above configuration, in the renewable energy-use power system, when the generated power by the power generation unit sufficiently meets the output power of the renewable energy-use power system, the switch can be set to the OFF state, to cut off the battery from the DC bus. At this time, the DC-DC converter can set the voltage value of the DC power to be output to a voltage at which the power conversion efficiency of the entire system be maximized. Optimal control is therefore possible. Also, when the battery is neither charged nor discharged, the switch can be set to the OFF state, to cut off the battery from the DC bus. Therefore, the life of the battery, which is a consumable article, can be prolonged.

According to another mode of the present disclosure, a renewable energy-use power system includes: a power generation unit configured to generate electric power using renewable energy; a first DC-DC converter configured to convert an output of the power generation unit into DC power of a predetermined voltage; a second DC-DC converter configured to convert the output of the power generation unit into DC power of a predetermined voltage; a first switch configured to select one of an output of the first DC-DC converter and an output of the second DC-DC converter and output the selected one; a power conversion unit configured to convert the output of the first switch into DC power or AC power; a second switch connected to an output terminal of the second DC-DC converter and configured to be switchable between an ON state and an OFF state; a battery connected to the second switch; and a control unit configured to control the selection operation of the first switch and ON/OFF switching of the second switch.

With the above configuration, in the renewable energy-use power system, when the generated power by the power generation unit sufficiently meets the output power of the renewable energy-use power system, the first switch is made to select the output of the first DC-DC converter. Therefore, optimal control is possible by setting the output voltage of the first DC-DC converter to a voltage at which the power conversion efficiency of the entire system be maximized. Also, by making the first switch select the output of the second DC-DC converter and setting the second switch to the ON state, assist power from the power generation unit is supplied to the power conversion unit, in addition to the power of the battery. This can reduce the power consumption of the battery in this mode. Moreover, when the battery is neither charged or discharged, the second switch can be set to the OFF state, to cut off the battery from the output terminal of the second DC-DC converter. Therefore, the life of the battery, which is a consumable article, can be prolonged.

Embodiments of the present disclosure will be described hereinafter with reference to the accompanying drawings. It is to be noted that the following description of the preferred embodiments is essentially a mere illustration and by no means intended to restrict the present disclosure, the range of application thereof, or the uses thereof.

First Embodiment

FIG. 1 shows a configuration example of a renewable energy-use power system according to the first embodiment. In FIG. 1, a power generation unit 11 generates electric power using renewable energy. The power generation unit 11 is a photovoltaic (PV) battery or a thermoelectric generator (TEG), for example. A DC-DC converter 12 converts the output of the power generation unit 11 into DC power of a predetermined voltage and outputs the result to a DC bus 13. The DC-DC converter 12 is configured to be capable of changing the voltage value of the DC power to be output.

A DC-DC converter 14 converts the DC power of the DC bus 13 into DC power of a predetermined voltage. The DC power output from the DC-DC converter 14 is to be the output power of this renewable energy-use power system. The DC-DC converter 14 is an example of the power conversion unit according to the present disclosure. In place of the DC-DC converter 14, an inverter that converts the DC power of the DC bus 13 into an AC power may be provided as the power conversion unit. In this case, the renewable energy-use power system is to be coupled to a system, or to be used for a motor drive, for example.

A switch 15 is connected to the DC bus 13. The switch 15 is configured to be switchable between ON state and OFF state: its input terminal and output terminal are in electrical continuity in the ON state, and they are electrically discontinued in the OFF state. The switch 15 is constituted by a mechanical relay or a semiconductor switch, for example. A battery 16 is connected to the DC bus 13 via the switch 15. When the switch 15 is in the ON state, the battery 16 is electrically connected to the DC bus 13. When the switch 15 is in the OFF state, the buttery 16 is electrically cut off from the DC bus 13.

A control unit 17 controls the switching between the ON and OFF states of the switch 15. That is, the control unit 17 controls the switch 15 to be in the ON state when the battery 16 is charged or when the battery 16 is discharged. Also, the control unit 17 controls the switch 15 to be in the OFF state when the battery 16 is neither charged nor discharged.

It is herein assumed that the control unit 17 monitors the output of the power generation unit 11, the output of the DC-DC converter 14, and the state of the battery 16. Based on the monitored results, the control unit 17 controls the switching between the ON and OFF states of the switch 15. For example, when the generated power by the power generation unit 11 sufficiently meets the output power of the renewable energy-use power system, the control unit 17 sets the switch 15 to the OFF state, whereby the battery 16 is electrically cut off from the DC bus 13. Also, for example, when the battery 16 is running short requiring charging, the control unit 17 sets the switch 15 to the ON state, whereby the battery 16 is electrically connected to the DC bus 13, to allow supply of power from the DC bus 13 to the battery 16. Otherwise, when the generated power by the power generation unit 11 is insufficient to meet the output power of the renewable energy-use power system, the control unit 17 sets the switch 15 to the ON state, whereby the battery 16 is electrically connected to the DC bus 13, to allow supply of power from the battery 16 to the DC bus 13.

The control unit 17 then notifies the DC-DC converter 12 of the information on the ON/OFF state of the switch 15. The DC-DC converter 12 changes the voltage value of the DC power to be output depending on the ON/OFF state of the switch 15 indicated by the received information.

For example, when the switch 15 is in the OFF state, the DC-DC converter 12 outputs the DC power with a voltage at which the power conversion efficiency of the entire DC-DC converters 12 and 14 be maximized. As an example, the DC-DC converter 12 sets the voltage of the DC power to be output to an intermediate voltage between the output voltage of the power generation unit 11 and the output voltage of the DC-DC converter 14. On the other hand, when the switch 15 is in the ON state, the DC-DC converter 12 outputs the DC power with a voltage suitable for charge or discharge of the battery 16.

Figure 2:
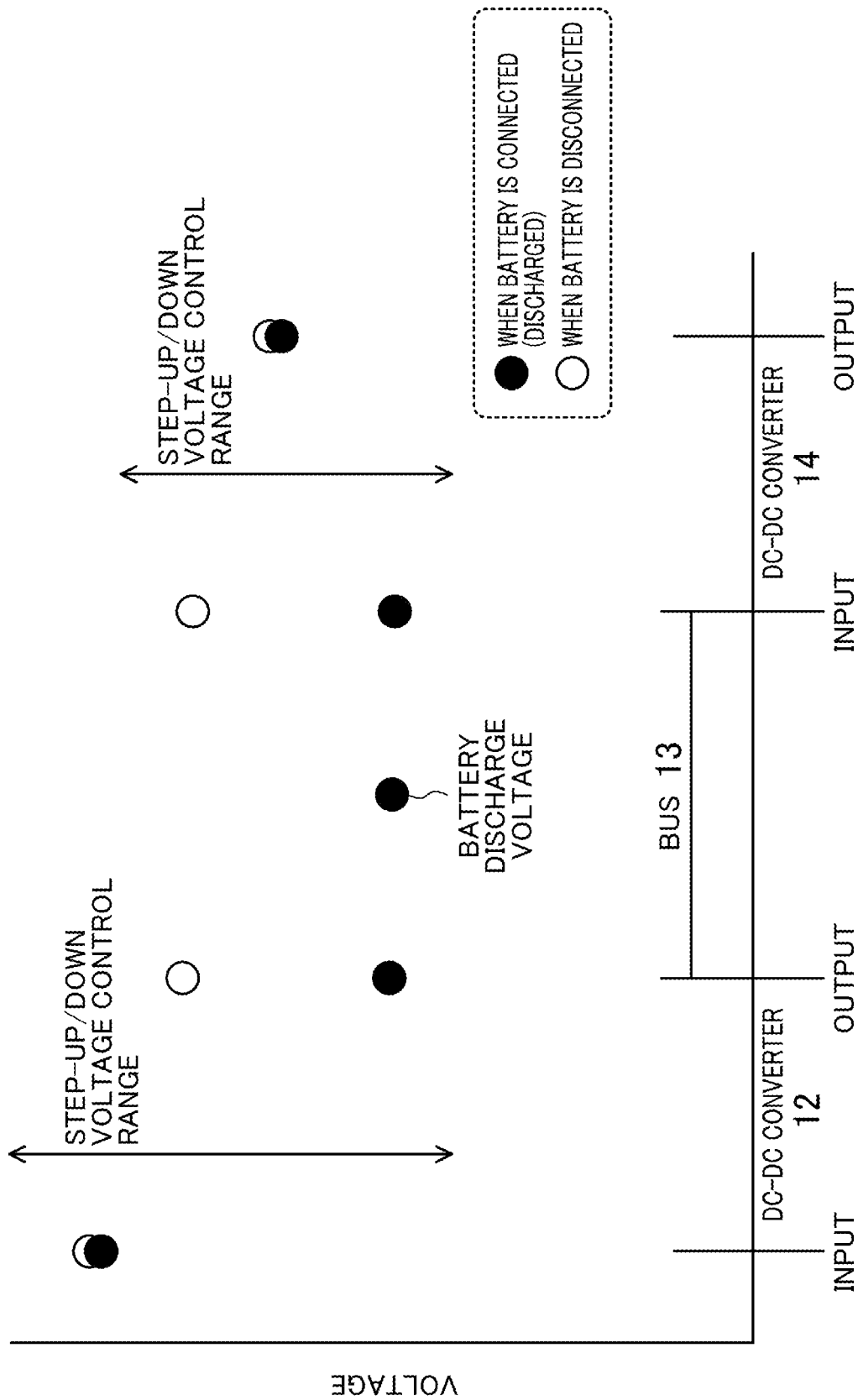
FIG. 2 is a view for explaining an effect of the renewable energy-use power system of FIG. 1.

FIG. 2 is a view for explaining an effect of this embodiment. FIG. 2 illustrates the voltage values at nodes in the power system of FIG. 1, i.e., the input and output nodes of the DC-DC converter 12, a node of the DC bus 13, and the input and output nodes of the DC-DC converter 14. The black circles indicate voltage values when the switch 15 is in the ON state in which the battery 16 is connected to the DC bus 13 and discharged. The white circles indicate voltage values when the switch 15 is in the OFF state in which the battery 16 is cut off from the DC bus 13.

As shown in FIG. 2, when the switch 15 is in the ON state allowing the battery 16 to be discharged, the voltage value at the node of the DC bus 13 becomes the discharge voltage of the battery 16, and the voltage values at the output node of the DC-DC converter 12 and at the input node of the DC-DC converter 14 also become substantially the same as the discharge voltage of the battery 16. On the other hand, when the switch 15 is in the OFF state cutting off the battery 16 from the DC bus 13, the voltage value at the node of the DC bus 13 is unaffected by the discharge voltage of the battery 16, but set to an intermediate voltage between the output voltage of the power generation unit 11 and the output voltage of the DC-DC converter 14, for example. With this, the power conversion efficiency of the entire system can be maximized. Note that, although the case of stepping down the output voltage of the power generation unit 11 is illustrated in FIG. 2, a similar effect will also be obtained when the output voltage is stepped up.

As described above, in the renewable energy-use power system of this embodiment, when the generated power by the power generation unit 11 sufficiently meets the output power of the renewable energy-use power system, the switch 15 can be set to the OFF state, and the voltage value of the DC bus 13 can be set to a voltage at which the power conversion efficiency of the entire DC-DC converters 12 and 14 be maximized. Therefore, optimal control related to output efficiency is possible with the DC-DC converters 12 and 14, whereby the power conversion efficiency of the renewable energy-use power system can be maximized. Also, when the battery 16 is neither charged nor discharged, the switch 15 can be set to the OFF state to cut off the battery 16 from the DC bus 13, whereby the life of the battery 16, which is a consumable article, can be prolonged.

Second Embodiment

Figure 3:
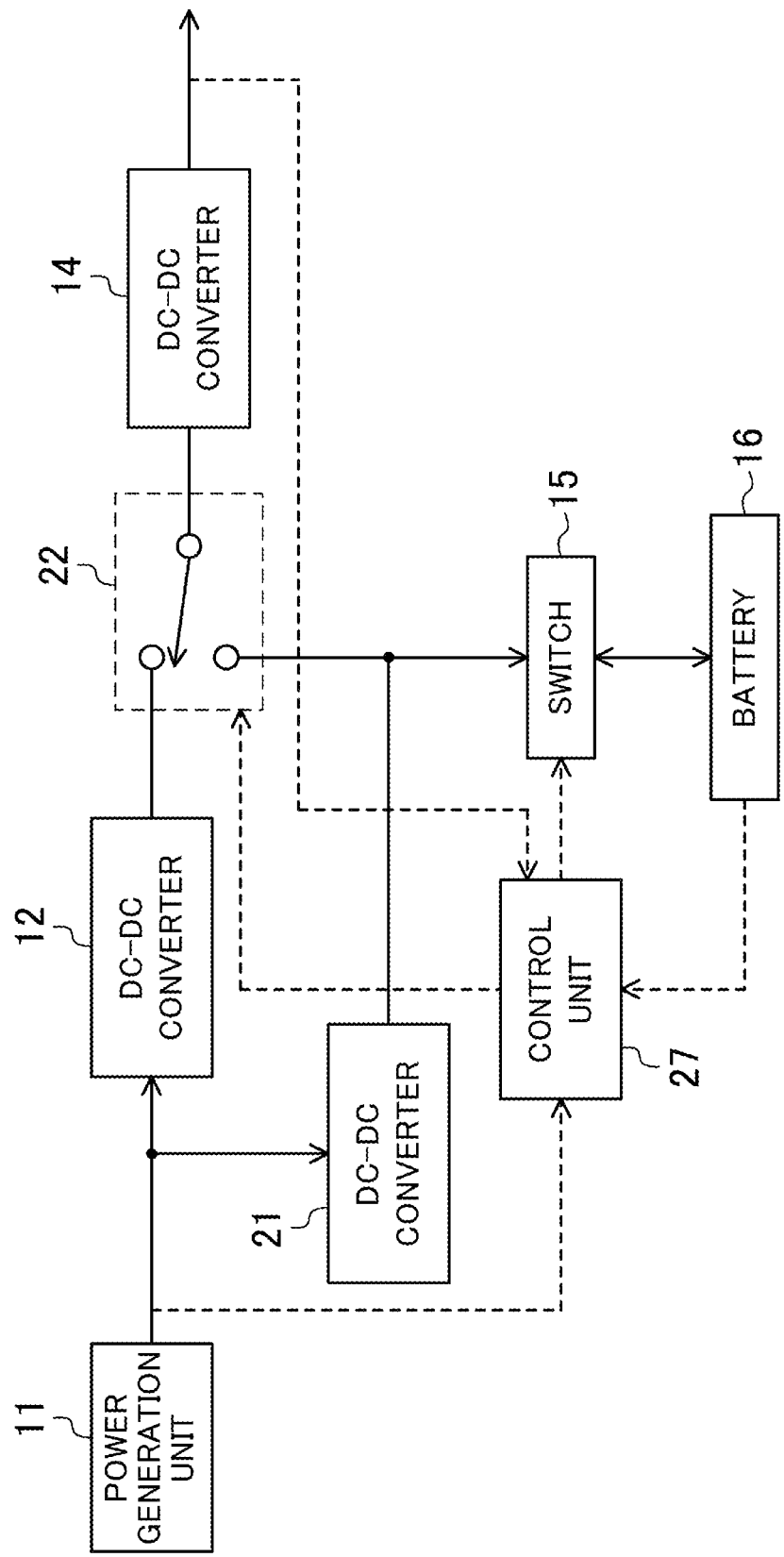
FIG. 3 shows a configuration of a renewable energy-use power system according to the second embodiment.
Figure 4:
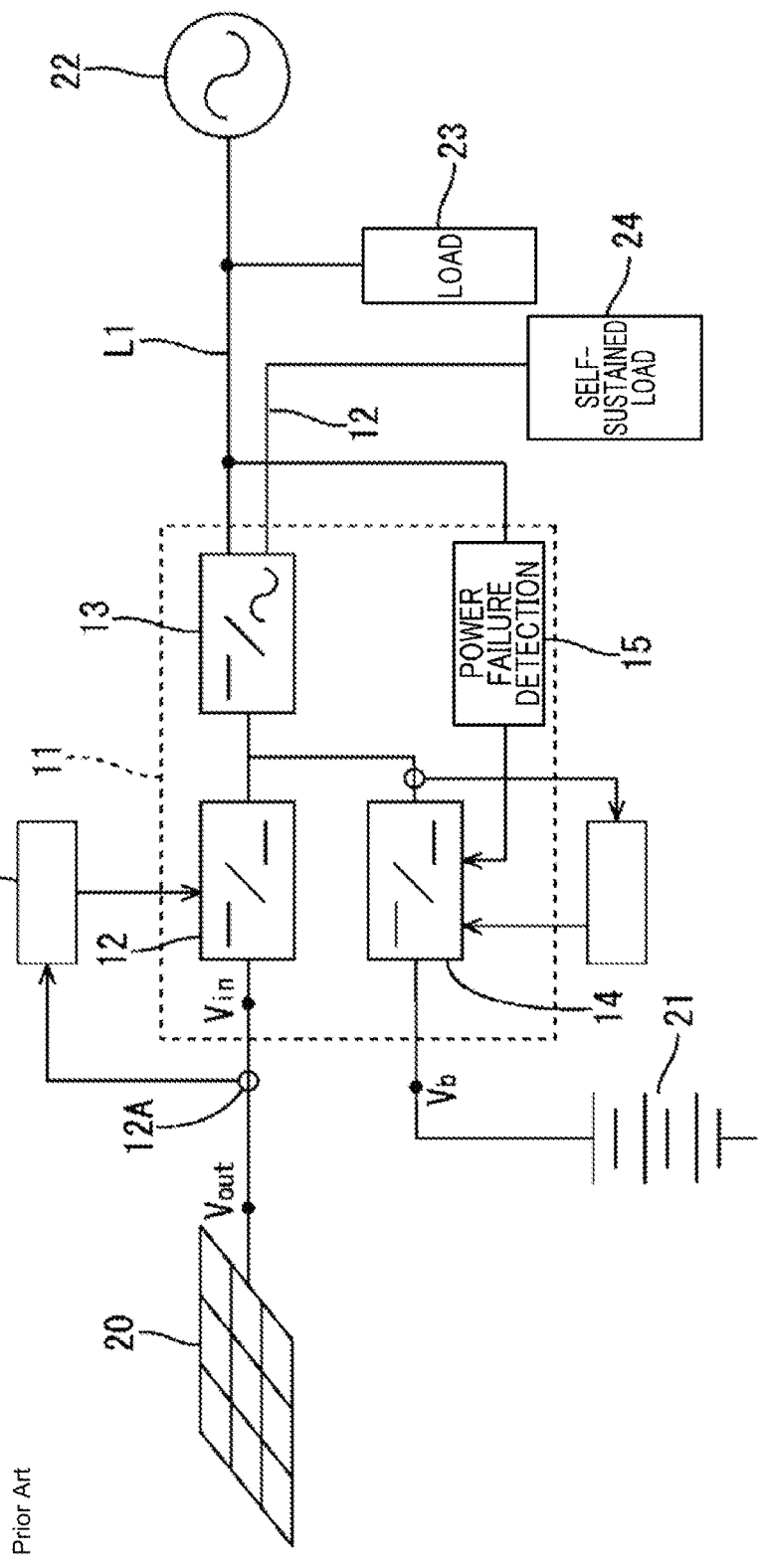
FIG. 4 shows a configuration example of a conventional solar photovoltaic system.

FIG. 3 shows a configuration example of a renewable energy-use power system according to the second embodiment. In this embodiment, components in common with the first embodiment are denoted by the same reference characters as in the first embodiment, and detailed description thereof is omitted here in some cases.

In this embodiment, the DC-DC converter 12 outputs DC power with a voltage at which the power conversion efficiency of the entire DC-DC converters 12 and 14 be maximized. On the other hand, a DC-DC converter 21 newly provided in this embodiment outputs DC power with a voltage suitable for charge/discharge of the battery 16.

A switch 22 selects one of the output of the DC-DC converter 12 and the output of the DC-DC converter 21 and outputs the selected one. The DC-DC converter 14 converts the output of the switch 22 into DC power of a predetermined voltage.

A control unit 27 controls the selection operation of the switch 22 and the switching between the ON and OFF states of the switch 15. That is, when the battery 16 is charged or when the battery 16 is discharged, the control unit 27 controls the switch 22 to select the output of the DC-DC converter 21 and also controls the switch 15 to be in the ON state. When the battery 16 is neither charged nor discharged, the control unit 27 controls the switch 22 to select the output of the DC-DC converter 12 and also controls the switch 15 to be in the OFF state.

It is herein assumed that the control unit 27 monitors the output of the power generation unit 11, the output of the DC-DC converter 14, and the state of the battery 16. Based on the monitored results, the control unit 27 controls the selection operation of the switch 22 and the switching between the ON and OFF states of the switch 15. For example, when the generated power by the power generation unit 11 sufficiently meets the output power of the DC-DC converter 14, the control unit 27 makes the switch 22 select the output of the DC-DC converter 12 and sets the switch 15 to the OFF state. Also, for example, when the battery 16 is running short requiring charging, the control unit 27 makes the switch 22 select the output of the DC-DC converter 21 and sets the switch 15 to the ON state. With this, power is supplied from the DC-DC converter 21 to the battery 16. Otherwise, when the generated power by the power generation unit 11 is insufficient to meet the output power of the DC-DC converter 14, the control unit 27 makes the switch 22 select the output of the DC-DC converter 21 and sets the switch 15 to the ON state. With this, power is supplied from the battery 16 to the DC-DC converter 14.

As described above, in the renewable energy-use power system of this embodiment, when the generated power by the power generation unit 11 sufficiently meets the output power of the renewable energy-use power system, the switch 22 is made to select the output of the DC-DC converter 12.

Therefore, optimal control related to output efficiency is possible with the DC-DC converters 12 and 14, whereby the power conversion efficiency of the renewable energy-use power system can be maximized. Also, by making the switch 22 select the output of the DC-DC converter 21 and setting the switch 15 to the ON state, assist power is supplied from the power generation unit 11 in addition to the output power of the battery 16. This can reduce the power consumption of the battery 16 in this mode. Moreover, when the battery 16 is neither charged nor discharged, the switch 15 can be set to the OFF state to cut off the battery 16 from the output terminal of the DC-DC converter 21, whereby the life of the battery 16, which is a consumable article, can be prolonged.

According to the present disclosure, in a renewable energy-use power system provided with a battery, it is possible to prevent decrease in power conversion efficiency, prevent increase in cost, and prolong the life of the battery. The present disclosure is therefore useful for energy savings and cost reduction of electric power systems.

The invention claimed is:

1. A renewable energy-use power system, comprising:
   a power generation unit configured to generate electric power using renewable energy;
   a DC-DC converter configured to convert an output of the power generation unit into DC power of a predetermined voltage and output the converted DC power to a DC bus;
   a power conversion unit configured to convert DC power of the DC bus into DC power or AC power;
   a switch connected to the DC bus and configured to be switchable between an ON state and an OFF state;
   a battery connected to the switch; and
   a control unit configured to control ON/OFF switching of the switch, wherein
   the DC-DC converter changes a voltage value of the DC power to be output depending on the ON/OFF state of the switch.

2. A renewable energy-use power system, comprising:
   a power generation unit configured to generate electric power using renewable energy;
   a first DC-DC converter configured to convert an output of the power generation unit into DC power of a predetermined voltage;
   a second DC-DC converter configured to convert the output of the power generation unit into DC power of a predetermined voltage;
   a first switch configured to select one of an output of the first DC-DC converter and an output of the second DC-DC converter and output the selected one;
   a power conversion unit configured to convert the output of the first switch into DC power or AC power;
   a second switch connected to an output terminal of the second DC-DC converter and configured to be switchable between an ON state and an OFF state;
   a battery connected to the second switch; and
   a control unit configured to control the selection operation of the first switch and ON/OFF switching of the second switch.

* * * * *